United States Patent [19]
Clayton, Jr.

[11] Patent Number: 4,733,048
[45] Date of Patent: Mar. 22, 1988

[54] CRASH PROOF NOZZLE

[75] Inventor: William L. Clayton, Jr., Fowlerville, Mich.

[73] Assignee: Raycon Textron Inc., Ann Arbor, Mich.

[21] Appl. No.: 74,571

[22] Filed: Jul. 17, 1987

[51] Int. Cl.[4] .............................................. B23K 26/00
[52] U.S. Cl. ........................ 219/121 LB; 219/121 LX
[58] Field of Search ................... 219/121 LA, 121 LB, 219/121 LU, 121 LV, 124.34, 121 LX; 901/42, 13

[56] References Cited

U.S. PATENT DOCUMENTS

| | | | |
|---|---|---|---|
| 3,392,259 | 7/1968 | Meier | 219/121 LU X |
| 4,389,561 | 6/1983 | Weman et al. | 219/124.34 |
| 4,406,940 | 9/1983 | Tsutsumi | 219/121 LV |
| 4,540,869 | 9/1985 | Yajuoka | 219/124.34 |

Primary Examiner—C. L. Albritton
Attorney, Agent, or Firm—John C. Evans

[57] ABSTRACT

A nozzle apparatus for focusing a beam of collimated radiation from a laser source has a spring mounted nozzle which contains the focusing lens or mirror system for establishing the actual size of the focal spot of the beam on a workpiece. Engagement of the tip of the nozzle with the workpiece or other obstacles will cause the nozzle to tilt away from the obstacle and means are responsive to such tilting movement to stop machine operation in order to clear the obstacle from the programmed path of operation of the spring mounted nozzle. Furthermore, means are provided to cause the entire assembly to be deflected upwardly when encountering an obstacle that is located in a centered relationship below the nozzle tip. The spring mounted nozzle repositions itself when it is free of the obstacle.

11 Claims, 7 Drawing Figures

U.S. Patent   Mar. 22, 1988   Sheet 2 of 2   4,733,048
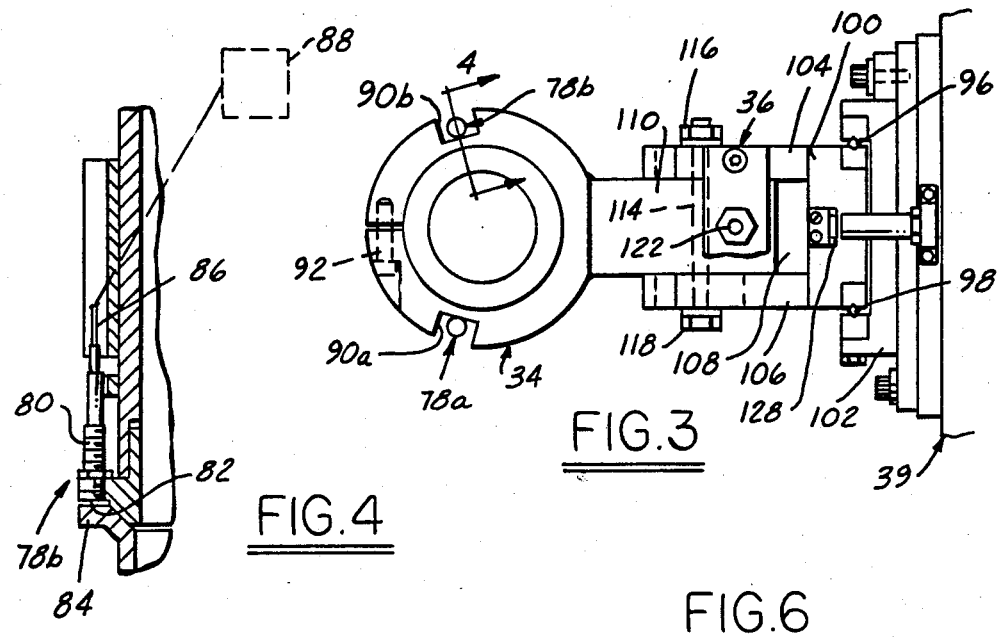
FIG.4
FIG.3
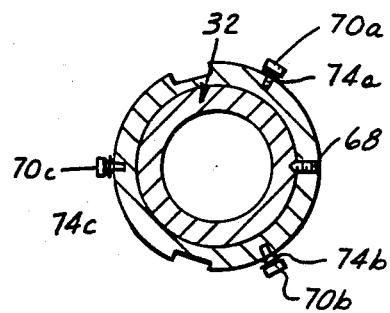
FIG.6
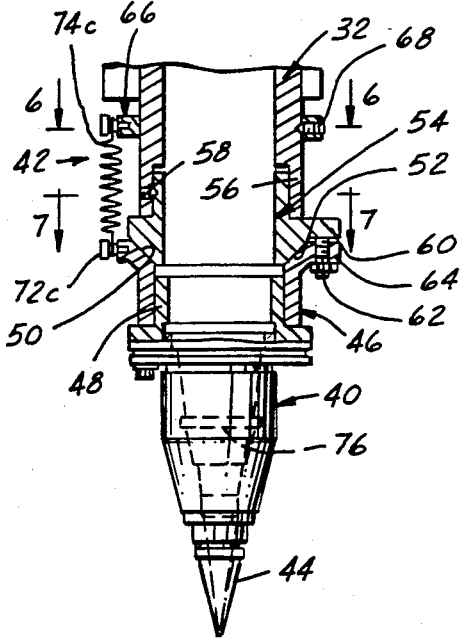
FIG.5
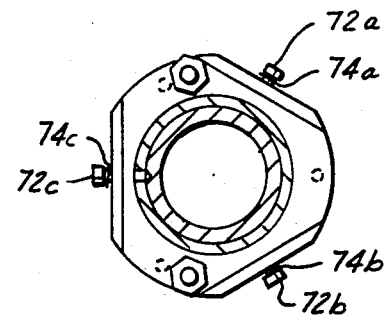
FIG.7

CRASH PROOF NOZZLE

TECHNICAL FIELD

This invention relates to nozzle apparatus for directing a laser beam against a workpiece and, more particularly, to such nozzle apparatus having lens components in the tip of the nozzle which require shock protection.

BACKGROUND ART

U.S. Pat. No. 3,986,767 discloses an optical focus device having a plurality of housing sections for beam focusing means. The housing sections are movable by drive motors with respect to one another to rotate the beam about a plurality of orthogonal axes. The housing is mounted on a gantry for three dimensional movement of the device with respect to a workpiece. While the device includes housing parts relatively movable with respect to each other, such parts are not mounted to absorb shock when the device hits an obstruction.

STATEMENT OF THE INVENTION AND ADVANTAGES

A feature of the present invention is to provide a nozzle apparatus for focusing a collimated beam from a laser source having means for mounting a nozzle tip on shock absorbing means that absorb energy to protect focusing components in the nozzle when it hits an obstruction.

Another feature of the present invention is to improve nozzle apparatus of the type having means for focusing a beam of collimated radiation from a laser source, including a nozzle housing to receive the beam from the laser source and a nozzle outlet for directing the laser beam to a workpiece by the provision of first and second nozzle housing portions and coupling means for interconnecting the first and second housing portions for freedom of movement therebetween for causing a tip of the nozzle to tilt when it contacts an obstacle. Means are responsive to the tilt movement to stop machine operation so that the obstacle can be cleared from a programmed path of movement of the nozzle apparatus.

Another feature of the present invention is to provide a nozzle apparatus having such first and second housing portions one of which defines the tip and means thereon to reposition the first nozzle portion with respect to the second nozzle portion when the obstacle is cleared and to provide for such repositioning by means of adjustable set screw means that will establish a desired aligned relationship between the first and second portions when the tip is in an unobstructed position.

Yet another feature of the present invention is to provide a nozzle apparatus of the type set forth in either of the preceding objects wherein the coupling means includes a plurality of equidistantly spaced springs and means for connecting the opposite ends of each of the springs between the first and second housing portions to maintain a spring balanced connection therebetween during unobstructed operation of the apparatus.

A specific embodiment of the invention includes a ball on one of the housing portions and a socket on the other of the housing portions which are held in a centered relationship to form an axially aligned nozzle passage to focusing lens means in the first housing portion that defines the tip of the nozzle. A flange on the socket includes a plurality of equal spaced set screws that are adjustably positioned to engage a radial flange on the ball to position the aligned first and second housing portions with one another so that when the nozzle is free of an obstacle it will return the first and second housing portion to balanced alignment.

The second housing portion includes a retainer ring secured thereto that has a plurality of screws connected at equidistant points therearound that align with like screws connected in the flange of the socket to form vertically aligned connection points for compression springs each of which has an opposite end connected to vertically aligned ones of the screws to impose a retention force between spherical ball and socket surfaces to seat the positioning set screws against the flange on the ball thereby to produce an axial alignment between the first and second housing portions. When the tip of the nozzle hits an obstruction, it deflects the first housing portion with respect to the second housing portion to cause one of the springs to elongate and the other springs to compress so as to tilt the first housing portion with respect to the second housing portion to absorb shock and prevent damage of the lens means within the nozzle tip. At the same time, such tilting movement actuates switch means located between the first and second housing portions. The switch means includes a limit switch fixedly secured to the flange of the ball which senses the proximity of an aligned surface on the flange of the socket. When the flange is out of alignment with the proximity switch, a signal will be produced that will stop machine operation in response to tilting movement of the nozzle tip.

The preferred embodiment further includes a slide assembly for vertically supporting both the first and second housing portions for movement in a vertical direction. If the tip hits an obstruction that is centered below the nozzle assembly, the first and second housing portions move with the slide assembly. The slide assembly carries a proximity switch that senses such vertical movement to produce a signal that will also stop machine operation until such obstruction is removed from the path of the nozzle tip.

Other advantages and a more complete understanding of the invention will be apparent to those skilled in the art from the succeeding detailed description of the invention and the accompanying drawings thereof.

BRIEF DESCRIPTION OF THE DRAWINGS

FIG. 3 is a sectional view taken along the line 3—3 of FIG. 2, looking in the direction of the arrows;

FIG. 4 is a fragmentary sectional view taken along the line 4—4 of FIG. 3;

FIG. 5 is an enlarged sectional view of a nozzle spring support system;

FIG. 6 is a sectional view taken along the line 6—6 of FIG. 5, looking in the direction of the arrows; and FIG. 7 is a sectional view taken along the line 7—7 of FIG. 5 looking in the direction of the arrows.

DETAILED DESCRIPTION OF THE PREFERRED EMBODIMENT

Figure 1:
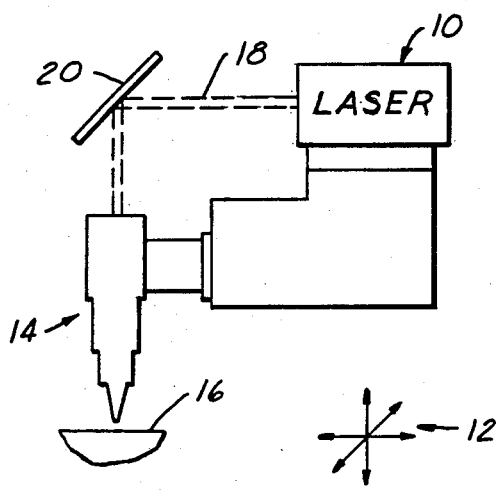
FIG. 1 is a diagrammatic view of a multi-axis laser machine including the nozzle apparatus of the present invention.

FIG. 1 shows a source of laser energy 10 that is supported with respect to a multi-axis machine drive 12 of the type including a base with cross-slides driven by servo-controlled electric drive motors for positioning a laser nozzle assembly 14 with respect to a workpiece 16. The system is operative to move the nozzle apparatus along multiple axes. A collimated beam 18 from laser source 10 is reflected by a mirror 20 to the nozzle apparatus 14. The nozzle apparatus 14 focuses the beam to define a spot size on the workpiece in accordance with the adjustment of lens means within the tip of the nozzle apparatus 14.

Figure 2:
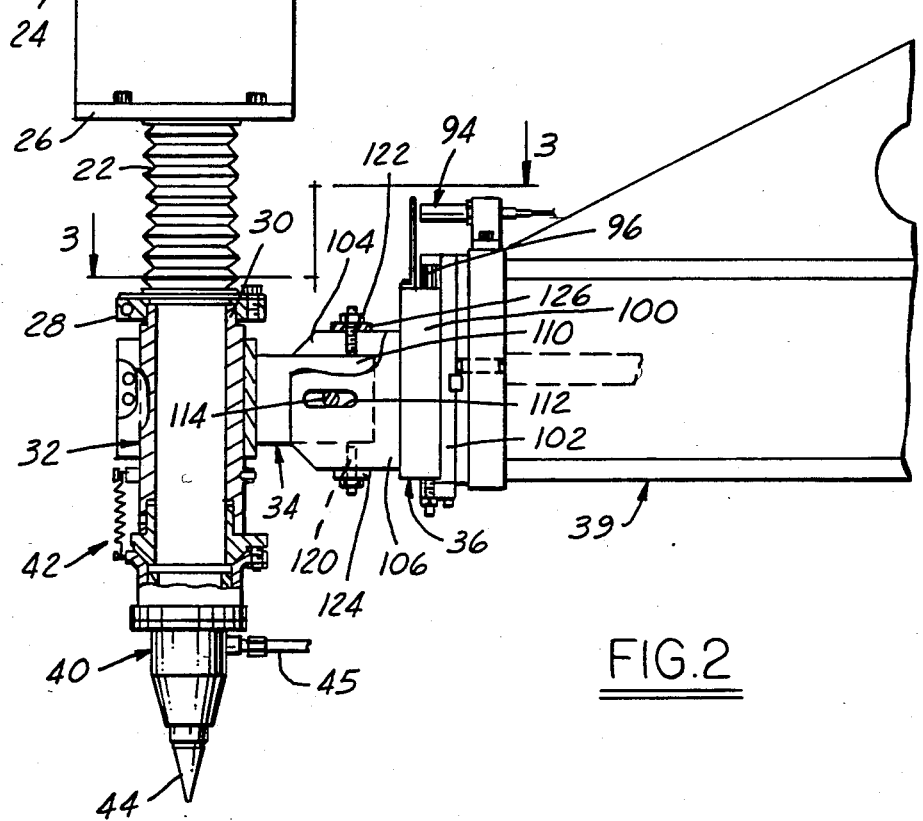
FIG. 2 is a view partly in elevation and partly sectioned of the nozzle apparatus of the present invention in association with an optics bracket.

As shown in FIG. 2, the nozzle apparatus 14 is connected by a flexible bellows 22 to a mirror housing 24 at an outlet plate 26 thereon. The bellows is connected to a retainer flange 28 on the upper end 30 of a first nozzle housing portion 32. The housing portion 32 in turn is connected by a collar assembly 34 to a slide assembly 36 which is operative to move the housing portion 32 vertically with respect to an optics frame 39. The frame 40 is connected to the multi-axis machine drive 12 for moving the nozzle assembly 14 through multiple, orthogonally arranged axes.

The upper housing 32 is joined to a lower or second housing portion 40 by a spring biasing system 42 that functions to permit the housing portion 40 to be tilted with respect to the housing portion 32 if the tip 44 of the housing portion 40 hits an obstruction as it moves with respect to the workpiece 16. A positioning handle 45 is connected to the housing portion 40.

Referring now more particularly to FIG. 5, the lower housing portion 40 receives a hollow socket member 46 on the upper end 48 thereof. The hollow socket member 46 includes a spherical seat 50 thereon that is held by the spring biasing system 42 against a spherical ball surface 52 formed on the end of a hollow ball member 54 that is received within a recessed end 56 of the first housing portion 32.

The ball member 54 is held against rotation by a set screw 58. It is thus located to position a reference flange 60 on the ball member 54 with respect to a plurality of adjustable set screws 62 carried on a reference flange 64 of the socket member 46.

The spring assembly 42 includes a retainer flange 66 that is connected to the outer surface of the first nozzle housing portion 32 in spaced relationship to the recessed end 56. It is held in a fixed angular relationship with respect to the housing portion 32 by a set screw 68. The retainer flange 66 carries a plurality of equiangularly spaced screws 70a, 70b, 70c that are located in vertical alignment with like screws 72a, 72b and 72c that are secured at equiangularly located points on the flange 64.

Compression springs 74a through 74c are connected at their opposite ends respectively between the screws 70a–70c and screws 72a–72c so as to uniformly spring bias the lower or second housing portion 40 into spring balanced, axial alignment with the first housing portion 32.

Thus, a beam from the laser 10 which is redirected by the mirror 20 from the mirror housing 24 thence through the bellows 22 to be focused by an objective lens 76 in the nozzle tip 44 will be focused thereby to form a desired focus spot on the workpiece 16.

The housing portions 32, 40 will be retained in the desired axial alignment unless the tip 44 hits an obstruction. In such case, the objective lens 76 is protected against shock by tilting deflection of the tip 44 with respect to the first housing portion 32. Such deflection causes certain of the springs 74a–74c to elongate and others to contract. At the same time, a pair of proximity switch assemblies 78a, 78b detect such tilting movement to produce a signal that will act to stop machine operation until the obstruction is removed.

As shown in FIG. 4, each of the proximity switch assemblies 78a, 78b include a switch housing 80 having a tip portion 82 located in close spaced relationship with an extension 84 on the socket flange 64. When the extension 84 is tilted away from the tip 82 of a proximity switch assembly 78a or 78b, it is conditioned to produce a signal through a lead wire 86 that is connected to a machine controller 88 operative to stop the machine.

The proximity switch assemblies 78a, 78b are positioned at slots 90a 90b, which are angularly located in the upper collar assembly 34 as shown in FIG. 3. Switch assemblies 78a, 78b thereby detect any tilting movement of the housing portion 40 with respect to the housing portion 32. As seen in FIG. 4, the upper clamp assembly 34 is fixed in a desired angular relationship by a clamp screw 92.

An obstruction located in axial alignment with the nozzle apparatus 14 at a point centered below the nozzle tip 44 will be undetected by switches 78a, 78b since the tip 44 will not be tilted by such an obstruction. Such an obstruction, however, will raise the nozzle apparatus 14 on the slide assembly 36 to cause a third proximity switch assembly 94 to produce a signal that will be directed to the machine controller 88 to stop machine operation until the vertically arranged obstruction is removed from the operating path of the nozzle apparatus 14.

The slide assembly 36 includes a pair of spaced slide ways 96, 98 that support a plate 100 for vertical movement with respect to a base 102 that is secured to the optics frame 39. The plate 100 has two spaced side walls 104, 106 connected thereto by a cross piece 108. The two side walls 104, 106 define a space for receiving an extension 110 on collar assembly 34. Slot 112 in walls 104, 106 provide for lateral positioning of the nozzle apparatus 14 with respect to the optics frame 39. The slots 112 receive a bolt 114 that is secured by nuts 116, 118 to fasten the extension 110 in an adjusted relationship laterally of the slide assembly 36. The extension 110 is adjusted vertically with respect to the slide assembly 36 by a pair of screws 120, 122 that are threadably received in an upper and lower plate 124, 126, respectively, to clamp against the top and bottom of the extension 110 when it is in its adjusted position.

Accordingly, when the laser nozzle assembly 14 is properly preadjusted, it will track accurately on the slide way assembly 36 when the tip 44 engages a centered, vertical obstruction. A switch armature 128 will thereby be aligned with the proximity switch 94 to produce a signal on lead line 130 to stop the machine until the obstruction is cleared.

What is claimed is:

1. In nozzle apparatus for focusing a beam of collimated radiation from a laser source, the nozzle apparatus including a nozzle housing having a nozzle inlet, beam focusing means and a nozzle outlet and drive system for moving the nozzle apparatus with respect to a workpiece against which the collimated radiation is focused the improvement comprising:

upper housing means for receiving the beam from the laser source;

lower housing means connected to said upper housing means having beam focusing means therein and a nozzle tip;

coupling means for spring mounting said lower housing means on said upper housing means for causing shock absorbing movement with respect to said upper housing means when said lower housing means contacts an obstacle;

and switch means responsive to shock absorbing movement between said upper and lower housing means for signaling the machine drive means to stop until the obstruction is removed.

2. In the nozzle apparatus of claim 1, said coupling means including a plurality of equidistantly arranged springs and means for connecting the opposite ends of each of said springs to said upper housing means and said lower housing means to maintain a spring biased, balanced axially aligned connection therebetween during unobstructed operation of the nozzle apparatus, said springs selectively yielding when the lower housing means contacts an obstacle to cause the lower housing means to tilt with respect to said upper housing means.

3. In the nozzle apparatus of claim 1, said upper housing means including a first bearing surface thereon, said lower housing means having a second bearing surface thereon congruent with that of said first bearing surface and in contact therewith during unobstructed operation of the nozzle apparatus;

said coupling means including spring means for biasing the first and second bearing surfaces together and yielding when the nozzle is obstructed to cause a portion of the first and second bearing surfaces to separate and another portion thereof to remain in contact so as to tilt the lower housing means with respect to the upper housing means.

4. In the combination of claim 1, means for supporting both of said upper and lower housing means for moving the nozzle apparatus upwardly when said lower housing means encounters an obstacle centered immediately below said nozzle tip.

5. In the combination of claim 1, driven frame means for supporting the nozzle apparatus, bellows means having one end connected to said driven frame means and an opposite end connected to said upper housing means, and track means fixed to said driven frame means for vertically slideably supporting said upper housing means on said driven frame means so as to compress said bellows means when said lower housing means encounters an obstacle below the nozzle apparatus.

6. In nozzle apparatus for focusing a beam of collimated radiation from a laser source, the nozzle apparatus including a nozzle housing having a nozzle inlet, beam focusing means and a nozzle outlet and a machine drive system for positioning the nozzle apparatus with respect to a workpiece against which the collimated radiation is focused, the improvement comprising:

an upper housing and an expandable bellows connecting the upper housing to the laser source;

lower housing means connected to said upper housing having the focusing lens means therein; and coupling means for providing relative tilting movement between said lower housing means and said upper housing means when said lower housing means contacts an obstacle.

7. In the combination of claim 6, and means responsive to relative tilting movement of said upper and lower housing means for stopping the machine drive system from moving the nozzle apparatus with respect to the workpiece.

8. In the nozzle apparatus of claim 7, said coupling means including spring means for connecting said upper housing means and said lower housing means to maintain an axially aligned relationship therebetween during unobstructed operation of the nozzle apparatus;

said spring means yielding when the lower housing means contacts an obstacle so as to cause said lower housing means to tilt with respect to said upper housing means.

9. In the nozzle apparatus of claim 7, said upper housing means including a first bearing surface thereon, said lower housing means having a second bearing surface thereon congruent with that of said first bearing surface and in contact therewith during unobstructed operation of the nozzle apparatus;

said coupling means including spring means for biasing the first and second bearing surfaces together and yielding when the nozzle hits an obstruction to cause a portion of the first and second surfaces to separate and another portion to remain in contact so as to absorb energy as the lower housing means tilts with respect to the upper housing means.

10. In the combination of claim 7, means for supporting both of said upper and lower housing means for moving the nozzle apparatus upwardly when said lower housing means encounters an obstacle centered immediately below the nozzle tip.

11. In the combination of claim 7, driven frame means for supporting the nozzle apparatus, bellows means having one end connected to said driven frame means and an opposite end connected to said upper housing means, and track means fixed to said driven frame means for vertically slideably supporting said upper housing means so as to compress said bellows means when said lower housing means encounters an obstacle centered below the nozzle apparatus.

* * * * *